(No Model.)
W. X. STEVENS.
WHEEL.
No. 538,711.
Patented May 7, 1895.
Fig I.
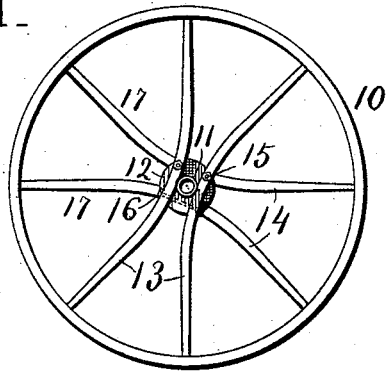
Fig II.
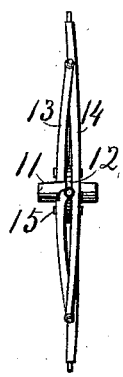
Fig V.
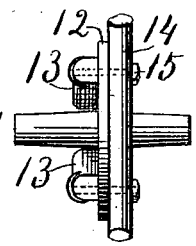
Fig III.
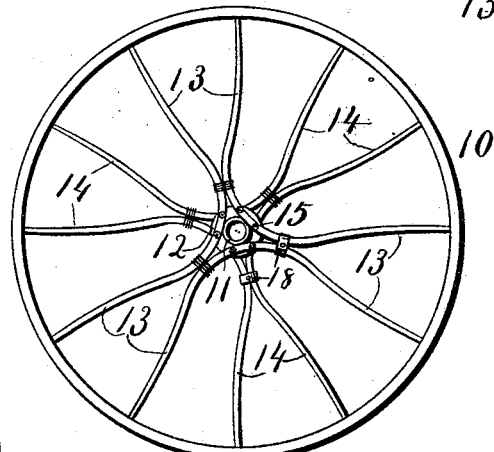
Fig VI.
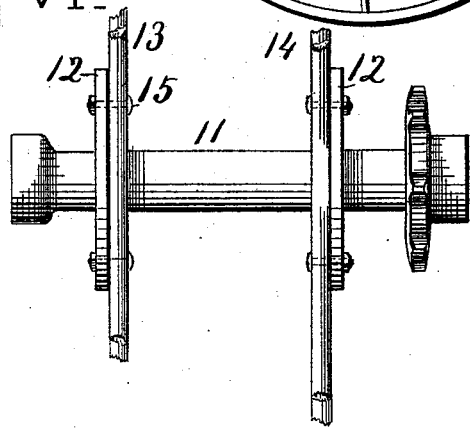
Fig IV.
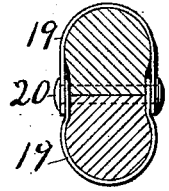
Witnesses,
Mary C. Hillyard
Inventor.
William X. Stevens
THE NORRIS PETERS CO., PHOTO-LITHO., WASHINGTON, D. C.

UNITED STATES PATENT OFFICE.

WILLIAM X. STEVENS, OF WASHINGTON, DISTRICT OF COLUMBIA.

WHEEL.

SPECIFICATION forming part of Letters Patent No. 538,711, dated May 7, 1895.

Application filed August 21, 1894. Serial No. 520,918. (No model.)

*To all whom it may concern:*

Be it known that I, WILLIAM X. STEVENS, a citizen of the United States, residing at Washington, in the District of Columbia, have invented a new and useful Improvement in Wheels; and I do hereby declare the following to be a full, clear, and exact description of the same, reference being had to the accompanying drawings, in which—

Figure I is a side view of a wheel according to my invention. Fig. II is an edgewise view of the same wheel without the rim. Fig. III is a side view of a wheel according to my invention, showing more spokes and a more elaborate and unique design. Fig. IV shows a detail view on a larger scale. Fig. V is a side view of a hub and portions of the attached spokes. Fig. VI is a side view of a hub common to bicycles with portions of spokes attached according to this invention.

My invention relates in general to vehicle wheels and particularly to wooden spokes therefor.

Heretofore wooden spokes have usually been shaped each with a tenon at one end to be driven into the wheel hub, and with another tenon at the other end upon which the wheel rim is driven, and a great many inventions have been made with the object of strengthening the attachment of the hub to the spokes because such spokes become loose in the hub from shrinkage and then the great strains to which wheels are subjected in carrying heavy loads over sideling places, in striking raised car tracks at a sharp angle, &c., tends to force the hub out of the plane of the wheel and break it loose from the spokes.

The object of this invention is to construct a wooden spoked wheel which shall be stronger at the hub, stiff in its driving capacity, more elastic in general service, more picturesque in appearance, and cheaper; also, to provide spokes that may be more readily replaced in case of breakage.

To this end my invention consists in the construction and combination of parts forming a vehicle wheel hereinafter described and claimed.

10 represents the rim or felly of the wheel. 11 is the hub which for the purposes of my invention is provided with a flange 12.

13 and 14 represent the spokes which are the main characteristics of this invention and which for the purposes of this application for a patent I call double spokes, because each piece of spoke wood enters the rim at two different points and extends therefrom to the hub like two spokes of the old style. All the spokes 13 are at one side of the flange 12, and all of the spokes 14 are at the other side of the same flange, and at each crossing of a spoke 13 with a spoke 14 there is a bolt 15 firmly binding the spokes to the flange. By this means it will be seen in Fig. III, that each of the six spoke woods is held by two bolts, and that twelve spokes are thus held to the hub by six bolts. Each spoke has the advantage of its double or mate extending to a distant point across the rim and there secured so that the hub cannot break one spoke without breaking two; and each one of the two spokes of any piece has the advantage of bearing across the hub more than twice the usual length of a tenon in the same sized common wheel.

The bolts 15 may be either provided with screws and nuts or with rivet heads so that they may be readily tightened when the wood of the spokes shrinks. Eight single or four double spokes as shown in Fig. I, is the least number of spokes with which the idea of this invention may be carried out. In that case the hub comprises the box or bearing portion 11 and the flange 12 in one piece, and yet the box may be provided with either fixed or loose bushings, the flange may be a separate piece secured rigidly to the hub, or there may be more than one flange and spokes fastened to each as in Fig. VI. In that case the series 13 of spokes may be secured to one flange and the series 14, to the other flange. Of course it is understood that twice as many spokes may be accommodated on two flanges as on one of the same hub. Instead of bolting through the flange or in addition thereto I may extend bolts 16 through the hub crosswise of, but to one side of the axle, but as that plan would require a heavier hub and less strength I do not think it will be adopted. In this respect I think it quite important for the bend of the double spoke to rest firmly against the hub as a preventive to bursting out of the grain of the wood which are under bending strain. Whatever the design of curves may be in the spokes, pains should be taken to terminate each spoke radially at the rim in order that its tenon may be straight with the grain. Arms extending across a wheel and forming two spokes each, are not new if the axle passes through the arm midway, or if the spokes are straight throughout their length. It is also common to construct wooden drum wheels with framed arms in positions like the dotted lines 17, but such construction would require too large a hub to meet the arms and make a practical vehicle wheel.

In that class of wheels known as "suspension wheels" wire spokes have been made double and secured at both ends to the rim, but never secured rigidly to the hub. Such double spokes merely loop over some hooklike projection of the hub to suspend the hub, and were it left to one such double spoke the hub would not be held in place during a revolution, but in my wheel, the hub being held rigidly to each spoke, and its wooden spokes having a character of stiffness not possessed by wire every double spoke will alone hold the hub in place, and by the words "Rigidly secured" used in the claims I mean, so secured to the hub that freeing the ends of the spoke from the rim would not enable the spoke to be changed in position relative to the hub.

If the spokes be curved so as to touch together as at 18, Fig. III, the wheel may be greatly stiffened by binding the adjacent spokes together at those points. This may be done with wire as wire spokes of bicycle wheels are bound together, or a strap 19, Fig. IV, may be provided with a bolt or rivet 20 to clamp it midway so as to draw the spokes together firmly. The spokes may be secured to the rim in any way such as the usual tenon entering the rim and spread by wedges.

In case a spoke of this wheel gets broken it may be unbolted from the hub and drawn inward from the rim. Then the ends of the new double spoke may be inserted in the rim and be gradually driven outward while the midway portion is being pressed toward the flange and when thus brought to place it may be bolted to the flange.

In this wheel there can be no splitting of the hub, no breaking of tenons therein, and much less liability of breaking spokes in any way. Therefore a very much lighter wheel will serve in any case.

Taking into account the boring, mortising, banding and building up of hubs with collars, &c., according to old methods of wheel making it is believed that wheels may be made according to this invention at less expense and that they will be stronger weight for weight.

Having thus fully described my invention, what I believe to be new, and desire to secure by Letters Patent, is the following:

1. The combination in a vehicle wheel, of a rim; a hub and curved double spokes; each spoke piece being secured at both ends to the rim and midway secured rigidly to the hub, substantially as described.

2. The combination in a vehicle wheel, of a rim; a hub; and curved spokes located with the midway portion of each tangent to the hub and rigidly secured thereto; both ends of each spoke piece being secured to the rim, substantially as described.

3. The combination in a vehicle wheel, of a rim; a hub and double spokes, each double spoke being curved and located tangent to the hub and to the adjacent spoke, and secured to both, and secured at both ends to the rim.

4. The combination in a vehicle wheel of a rim; a flanged hub; and curved double spokes located beside the flange and bolted thereto; and both ends of each double spoke secured to the rim, substantially as described.

5. The combination in a vehicle wheel, of a rim; a hub; and double spokes of bent wood; each double spoke being secured rigidly to the hub and at two points of the rim, substantially as described.

In testimony whereof I affix my signature in presence of two witnesses.

WILLIAM X. STEVENS.

Witnesses:
WM. L. SPEIDEN,
M. C. HILLYARD.